United States Patent Office
2,916,389
Patented Dec. 8, 1959

2,916,389

HIGH-CALCIUM LIME REFRACTORIES AND METHOD FOR MAKING THEM

Robert W. McAllister, Carlisle, Mass.

No Drawing. Application June 6, 1957
Serial No. 663,892

14 Claims. (Cl. 106—60)

This invention relates to the preparation of a refractory lime and more particularly to a lime composition which is capable of being employed as a refractory material at very high temperatures.

It would be desirable to be able to use quick lime, CaO, as a refractory material since it has a high melting point, i.e., about 4600° F. However, CaO is subject to hydration in the presence of moisture and the resulting calcium hydroxide which is formed decomposes at about 1100° F. to CaO and $H_2O$, simultaneously changing in physical form and shape. This means that it is no longer serviceable as refractory material. It is necessary, therefore, to modify lime to make it stable under conditions prevailing in refractory use.

Lime has the advantage of being abundant and cheap in addition to having a relatively high melting point. Because of this many attempts have been made in the past to modify or to otherwise treat lime in such a manner that it could be used as a high-temperature refractory material. Such methods have included adding titanium dioxide (see U.S. Patent 2,528,471), adding titanium dioxide and zirconium dioxide (see U.S. Patent 2,678,887), roasting calcium-containing ores, or adding various other oxides, including those of cerium, molybdenum, chromium, sodium, lanthanum, etc., in an attempt to dead burn the lime by much the same process by which lolomites are dead burned. However, none of these methods has proved entirely satisfactory and none of them has offered a means of making a cheap and stable lime refractory.

The term, "lime" is used generally to indicate a burned product and will be used in a generic sense hereinafter in this description. More precisely, calcium oxide, CaO, is known as quick lime; calcium hydroxide, $Ca(OH)_2$ is known as hydrated lime; while the carbonate, $CaCO_3$, is known as limestone. The lime applicable to the process of this invention includes these three compositions and refers more specifically to what is called high-calcium lime, i.e., a lime having not more than 5% magnesia, MgO. (See for example the definition of high-calcium hydrated lime in ASTM Standards, part 3, pages 263–4 (1955).) Although any of these forms of lime may be used in the practice of this invention, it has been found preferable to employ $Ca(OH)_2$ or $CaCO_3$ as the initial form. These will, of course, decompose under heating to form CaO.

Because of the abundance of lime and its relative cheapness, it would be desirable to be able to treat high-calcium lime with a minimum amount of an additive in order to be able to dead burn it to make it usable as a high-temperature refractory which would not be subject to hydration or delayed slaking. It would also, of course, be desirable to be able to use an additive which itself would not add materially to the cost of the final refractory.

The process of dead burning dolomite (i.e., heating it to the point where all of the water is driven off and the dolomite becomes inert to the atmospheric moisture) has been known and used for a number of years. However, dead-burned dolomite, because it contains some CaO, is subject to delayed slaking and it has never been found possible to store dead-burned dolomitic refractory materials over any extended period. Normally, as a matter of fact, it is required that such dolomitic refractory materials be put to use not later than about one or two months after they have been made. Furthermore, it has never been possible, to my knowledge, to make a dead-burned dolomitic block refractory or to shape dead-burned dolomite in any other form which would remain structurally stable throughout any normal storage period.

In my co-pending applications, Serial No. 663,891, I have disclosed a means by which high-calcium lime may be deactivated with the addition of certain clays or mixtures of alumina and silica, and also in Serial No. 663,893, how high-magnesium lime (or more commonly called dolomites) may also be inactivated by the addition of certain additives. The invention described hereinafter is concerned with the addition of minor amounts of two inactivators, the addition of which permits dead burning high-calcium lime to produce a stable refractory material which can be used either in brick form or in grain form.

It is therefore an object of this invention to provide a refractory material, essentially all of which is lime which is not susceptible to hydration or slaking. A further object is to provide a cheap refractory material which is capable of withstanding high temperatures up to at least 3300° F., and probably up to 3500° F. It is another object to provide a means by which high-calcium lime may be dead burned to make a refractory material which is not subject to slaking or hydration. It is still another object to provide a deactivated high-calcium lime which can be shaped into blocks and other forms or which may be used as a grain refractory. It is yet another object to provide a refractory material which can be stored over extended periods of time before actual employment in furnaces or similar uses. It is still another object to provide a grain refractory material which may be used as an open-hearth lining material at temperatures higher than those which can now be tolerated by present day refractories thus materially increasing the life of the furnace. These and other objects will be apparent in the following description.

As indicated above, the lime may be used in the form of CaO, $Ca(OH)_2$, or $CaCO_3$, inasmuch as during the heating of the composition to make the refractory material of this invention, the latter two of these are converted to CaO; that is, the $Ca(OH)_2$ decomposes to CaO and $H_2O$, while the $CaCO_3$ decomposes to CaO and $CO_2$.

The refractory material of this invention, which is capable of withstanding high temperatures and is yet resistant to hydration, is formed by incorporating into finely divided lime, in one of the three forms noted above, a minor amount of MgO and an iron-containing compound. After very thorough mixing of the high-calcium lime and the additives, the mixture is burned in any suitable equipment, such as a rotary kiln, or formed into dobies and baked. The pellets from the kiln may be used as grain refractories with or without further crushing, and the dobies may be crushed to size and formed into any desired shape for further heating and pressing.

The refractory material of this invention can be used at temperatures up to at least 3300° F. Furthermore, the refractory material may be stored either in the form of blocks or grains for extended periods of time without losing its characteristics as a good refractory, i.e., without slaking.

Although the addition of small quantities of an iron-containing compound to dolomitic lime (usually CaO.MgO) in the process of dead burning has been known and extensively used to produce a grain refractory material which is effective as long as it is used almost immediately after it is made, I am not aware that anyone has ever succeeded in making a dead-burned, high-calcium lime refractory which is stable over long periods of time and which may be used as blocks, as well as in grain form. I have found that such a high-calcium lime refractory material can be successfully made, provided both iron and MgO are present in the high-calcium lime. The quantities of these additives are small, but essential.

Iron may be added in any convenient form which will, when exposed to the heating of the process (usually of the order of 2500° F. or higher), be converted into the oxide, probably $Fe_2O_3$. Thus, I have found that pyrophoric iron, $Fe_2O_3$, FeO, or such iron compounds as the oxalate, citrate, nitrate and the like, may be successfully used. Because of its finely divided form and its reactivity, pyrophoric iron has been found preferable in the practice of this invention. Quantities of the iron may be expressed in terms of $Fe_2O_3$ equivalent, since it is believed that the iron is actually oxidized in the process. I have found that the equivalent of 1% $Fe_2O_3$ by total weight of the final refractory will achieve some inactivation, while 2% will achieve at least partial inactivation. However, the use of the 3% equivalent $Fe_2O_3$ has been found to give complete inactivation. Above 3% no apparent improvement is obtainable, although quantities up to 10% have been used. Therefore, the preferred range may be defined as between about 3 to 5% expressed in terms of $Fe_2O_3$. The inclusion of 5% in defining the preferred range takes into account the fact that a small additional amount may be desirable to compensate for achievement of less than perfect mixing. If pyrophoric iron is to be used, a preferred range is then from about 2 to 3.5% of the total weight of the refractory material.

Since it is essential to obtain the highest degree of mixing possible of the high-calcium lime with the additives, it is desirable that the iron compound introduced to supply iron oxide be in the finest particle sizes as is conveniently possible to obtain. It is believed that a solid state reaction takes place between the additives and the CaO, and for this reason the finer the particle size the better the mixing and the more effective is the additive. For this reason, pyrophoric iron is preferred, inasmuch as it is available in size ranges from about 1 to 40 microns.

The MgO required may be present in the high-calcium line, or may be introduced as a dolomitic compound such as dolomitic limestone, dolomitic hydrate, or as dolomite. The MgO may also, of course, be introduced as pure, finely divided MgO. Usually it will be more economical to introduce the MgO in the form of a natural-occurring dolomitic compound. The MgO should be present in the final refractory in quantities equivalent to at least 2% of the weight of the final refractory. Quantities of MgO up to about 5% are permissible, but above about 2% no improvement in the characteristics of the refractory has been noted. As in the case of the iron-containing compound, it is essential that the MgO be introduced in as finely divided state as possible to achieve a high degree of mixing. Inasmuch as dolomitic hydrate normally occurs in particle sizes ranging from about 1 to 10 microns, this is the preferred form in which to introduce the MgO into the composition.

The final refractory is therefore comprised of high-calcium lime with minor amounts of iron oxide and MgO, while a preferred composition is 95% CaO, 3% iron oxide expressed as $Fe_2O_3$, and 2% MgO by weight. However, these quantities may be varied so that the ranges are from about 85 to 97% CaO, 1 to 10% $Fe_2O_3$ and 2 to 5 MgO. Minor amounts of impurities may occur, but it is preferred that not more than 1% $SiO_2$ and/or not more than 0.5% $Al_2O_3$ be present in the refractory.

In formulating the refractory, weight losses due to ignition (either because of loss of water or formation and elimination of $CO_2$) should be considered in calculating the amount of original components used. Thus, for example, if high-calcium lime hydrate, $Ca(OH)_2$ is used as a source of CaO, allowance must be made for the loss of water which is driven off in the heating process, a loss which generally amounts to about 25% by weight of the original hydrate.

The high-calcium lime used should, like the iron compounds and the MgO, be in as fine a particle size as is possible to obtain. For this reason, lime hydrate which normally occurs in particles in the range of 1 to 10 microns is preferred as the source of CaO. Crushed CaO normally will be in particle sizes ranging from about 20 to 80 microns and $CaCO_3$ (limestone) can be crushed to any size, preferably from about 20 to 80 microns.

Thorough initial mixing of the components of the refractory of this invention is of primary importance in order that the relatively small amounts of deactivating materials (iron compound and MgO) may come into intimate contact with the maximum number of CaO particles. The scale on which the mixing is to be accomplished will determine the type of mixing to be done. For example, in the laboratory, it has been found desirable to mix the components for about 5 minutes in a paddle-type mixer or any other suitable device. The mixture is then screened through an 80-mesh screen using a brush to force it through. Such product is then given a second mixing in the paddle mixer, followed by a second screening through an 80-mesh screen.

When the composition is mixed in large-scale industrial equipment, other mixing equipment may prove preferable. For example, wet mixing has been used whereby dry powder is wetted with enough water to permit wet ball-milling for several hours. A tube mill has also been found satisfactory. After the wet milling is completed, the wet paste is partially dried and then extruded into dobie bricks. Such bricks are then dried before they are fired.

If the components are dry mixed, or wet mixed and then dried, the resulting dry mixture may be pressed into dobie bricks at pressures sufficient to give the dobie strength enough to be removed from its mold form for subsequent heating. Pressures as low as 1 ton per square inch have been successfully used. Greater pressures may, of course, be used. The dobie bricks, which have been extruded and dried or which have been pressed dry, are then fired in the furnace at a temperature ranging from about 2600 to 2800° F. Firing is commonly carried out for about 4 to 24 hours and the dobies are permitted to cool gradually in the high-temperature furnace in which they were fired.

After the dobies have been cooled, they are crushed to the size desired in the formation of the final refractory. Particle size of the crushed material will vary according to the type of refractory required, and in many cases it will be necessary to mix and blend certain ranges of particle sizes to obtain the desired final result. After crushing and mixing of the particles according to size, kerosene may be added as a lubricant and the material is pressed into the desired shape, e.g., blocks, crucibles, etc. Final firing temperature after pressing is usually about 3000° F. The finally fired material is then permitted to cool slowly. Thus, it is possible to make refractory blocks of high-calcium lime by a process similar to dead burning, blocks which may be handled, stored for extended periods of time and used as desired in the same manner that other refractory blocks are used.

In addition to making blocks or other shaped forms from the refractory of this invention, it is possible to form grain refractories for such use as open-hearth furnaces, etc., by the techniques generally used in forming grain refractories. That is, the mixture of high-calcium lime, iron compound and MgO may be placed in a rotary kiln and after suitable mixing and heating discharged as pellets or grain refractories. These pellets may, of course, be further reduced in size if desired. Like the refractory blocks, the grain refractory material made by the process of this invention may be stored over extended periods of time without being subjected to delayed slaking.

In order to test the service suitability of the lime refractory of this invention, a number of kiln blocks were prepared in the following manner:

Two hundred pounds of high-calcium lime hydrate was thoroughly blended in a dry paddle-type mixer with 8 pounds of iron oxide and 4 pounds of light-weight magnesium oxide. After thorough blending in the paddle mixer the product was passed through a Raymond hammer mill three times. The product was then dry-pressed in a commercial brick-making press to form 9-inch straight bricks. Such bricks were then fired to 2800° F. over a 2-day heating cycle so that they were held at 2800° F. for 5 hours. The bricks, upon removal from the kiln, were crushed and screened and a mixture made comprising 10% product coarser than 8-mesh; 30% between 8- and 28-mesh; 15% between 28- and 65-mesh, and 45% finer than 65-mesh. This composition was mixed with 6% kerosene by weight and then pressed into arch-shaped kiln blocks sized for use in a 11-foot diameter rotary kiln. These 6-inch kiln blocks were then fired in a commercial brick-making tunnel kiln over a 5-day cycle to 2800° F. The blocks, upon removal from the tunnel kiln, were found to be unbroken with no signs of cracks. The density was 2.90. Two of such refractory kiln blocks were installed adjacent to each other at a point 40 feet from the discharge end of a commercial rotary lime kiln sized 11 feet in diameter and 300 feet long. Such section in a lime kiln is called the "high-temperature zone" and the most temperature-resistant refractories have very short life in this area. Such a lime kiln, when producing high-calcium lump lime, requires re-lining with high alumina (70% $Al_2O_3$) lining every two months in such high-temperature areas. The short refractory life is due to the impingement of the high-temperature flame against the refractory walls, as well as to the abrasive action of lump limestone rubbing against the refractory.

The two 6-inch refractory lime blocks of this invention survived 13 months in this high-temperature zone, and when removed were still about 2.5 inches thick. Such unusual life was attained in spite of more than 50 kiln shut-downs which cause most severe strains on any refractory. During the 13 months' operation, the kiln was out of service for the following protracted periods: once for 10 days, once for 7 days, and twice for 5 days.

The two refractory blocks, upon removal, were found to be unaltered in density, slake-resistance, or appearance. Had such blocks been installed throughout the entire high-temperature zone the service life would presumably have been greatly extended.

The refractory lime of this invention will resist slaking for long periods so that it may be shipped and stored for reasonable periods prior to installation. However, if such blocks are to be stored under high humidity conditions, or for long-time periods, I prefer to protect the refractory blocks from possible moisture absorption. This may be done by holding the blocks in sealed containers or by surface coating.

Thus, this invention provides a high-temperature refractory which is easily made from abundant and cheap materials and also a process for making such a refractory. It accomplishes this by so modifying high-calcium lime that it may be slake-resistant without materially reducing the temperature which it can withstand and yet maintain its structural integrity. This is done by adding only a very small amount of deactivating materials so that the melting point of the high-calcium lime is not lowered to any great extent. This modification in turn appears to consist of achieving some form of solid state reaction between finely divided CaO particles and the additives in the form of iron oxides and magnesium oxide. What the solid state reaction is, is not known, but it is believed that enough of the deactivators are present to react with CaO so that the remaining unreacted CaO particles have a certain protection against hydration when exposed to atmospheric moisture.

By the process of this invention, it appears possible for the first time to dead-burn a high-calcium lime in the presence of minor amounts of additives to form a high-temperature refractory which may be used either in a block form or in grain form. The achievement of such a high-temperature refractory in turn means that, for example, it may be employed in open-hearth furnaces and that its employment may materially extend the length of time such open-hearths may be operated without relining. This, in turn, means lower maintenance costs and a more economical operation of the open-hearth. There are, of course, many other applications which can use to good advantage refractories capable of maintaining their structural integrity at temperatures around 3300° F. or even higher.

I claim:

1. High temperature refractory consisting essentially of from about 85 to 97% CaO, 1 to 10% iron oxide and 2 to 5% MgO, a portion of said CaO being fused by heat with said iron oxide and MgO to form a protective matrix for the remaining portion of said CaO.

2. High temperature refractory consisting essentially of about 95% CaO, 3% iron oxide expressed as $Fe_2O_3$ and 2% MgO by weight, said iron oxide and MgO being fused by heat with a portion of said CaO to form a protective matrix for the remaining portion of said CaO.

3. A composition of matter suitable for heat-treating to form a high temperature refractory material, consisting essentially of a source of MgO selected from the group consisting of MgO, dolomitic hydrate, dolomitic limestone and dolomite, a source of iron oxide, and a source of CaO selected from the group consisting of CaO, $Ca(OH)_2$ and $CaCO_3$, said sources being present in quantities sufficient to provide in the final refractory material from about 2 to 5% total by weight MgO, 3 to 5% by weight $Fe_2O_3$, and the remainder CaO.

4. Composition of matter in accordance with claim 3 wherein said source of MgO is dolomitic hydrate.

5. Composition of matter in accordance with claim 3 wherein said source of iron oxide is pyrophoric iron.

6. Composition of matter in accordance with claim 3 wherein said source of CaO is high calcium lime hydrate $Ca(OH)_2$, ranging in particle size from about 1 to 10 microns.

7. A dead-burned high-calcium lime consisting essentially of 2 to 5% total MgO, 1 to 10% $Fe_2O_3$ and the remainder CaO, said proportions being by weight.

8. A dead-burned high-calcium lime in accordance with claim 7 wherein said $Fe_2O_3$ is present in amounts ranging from about 3 to 5%.

9. Process for making a high-temperature refractory material, characterized by the step of dead-burning high-calcium lime in the presence of MgO and an iron compound convertible to iron oxide in the process of dead-burning, the total concentration of said MgO and said iron oxide ranging from 2 to 5% and from 1 to 10% by weight of said refractory material, respectively, the remaining being CaO.

10. Process for making a high-temperature refractory material, comprising the steps of thoroughly mixing a source of CaO selected from the group consisting of CaO, $Ca(OH)_2$, and $CaCO_3$, with a source of MgO selected from the group consisting of MgO, dolomitic hydrate, dolomitic limestone and dolomite, and a source of iron oxide, heating the resulting mixture to a temperature between about 2600 and 3000° F. to fuse a portion of said CaO with said MgO and with said iron oxide to render substantially all of the remaining CaO inactive to slaking, said sources of MgO and iron oxide being present in quantities sufficient to provide concentrations ranging from 2 to 5% total MgO by weight and from 1 to 10% $Fe_2O_3$ by weight of said refractory.

11. Process for making a high-temperature refractory material comprising the steps of thoroughly mixing a source of CaO selected from the group consisting of CaO, $Ca(OH)_2$, and $CaCO_3$, with a source of MgO selected from the group consisting of MgO, dolomitic hydrate, dolomitic limestone and dolomite, and a source of iron oxide, pressing the resulting mixture into a mold with sufficient pressure to give the resulting shaped form structural integrity to be removed therefrom, heating the resulting form to a temperature between about 2600 and 2800° F. to fuse a portion of said CaO with said MgO and with said iron oxide to render substantially all of the remaining CaO present inactive to slaking, and removing the form from said mold, said sources of MgO and iron oxide being present in quantities sufficient to provide concentrations ranging from 2 to 5% total MgO by weight and from 1 to 10% $Fe_2O_3$ by weight of said refractory.

12. Process for making a high-temperature refractory material, comprising the steps of thoroughly mixing a source of CaO selected from the group consisting of CaO, $Ca(OH)_2$, and $CaCO_3$, with a source of MgO selected from the group consisting of MgO, dolomitic hydrate, dolomitic limestone and dolomite, and a source of iron oxide, pressing the resulting mixture into a first mold with sufficient pressure to impart structural integrity to the resulting formed article to be removed therefrom, heating the shaped article to a temperature between 2600 and 2800° F. to fuse a portion of said CaO with said MgO and with said iron oxide to render substantially all of the remaining CaO present inactive to slaking, removing the resulting first shaped form from said first mold, crushing said first shaped form to desired grain size, pressing the crushed material into a second mold with sufficient pressure to give it structural integrity to be removed therefrom, heating the resulting second molded form to 2600–3000° F. and removing said second molded form from said second mold, said sources of MgO and iron oxide being present in quantities sufficient to provide concentrations ranging from 2 to 5% total MgO by weight and from 1 to 10% $Fe_2O_3$ by weight of said refractory.

13. Process for making a high-temperature refractory material, comprising the steps of thoroughly mixing a source of CaO selected from the group consisting of CaO, $Ca(OH)_2$, and $CaCO_3$, with a source of MgO selected from the group consisting of MgO, dolomitic hydrate, dolomitic limestone and dolomite, and a source of iron oxide, heating the resulting mixture in a kiln to a temperature between 2600 and 2800° F. to fuse a portion of said CaO with said MgO and with said iron oxide to render substantially all of the CaO present inactive to slaking, and removing the resulting grain refractory thus formed, said sources of MgO and iron oxide being present in quantities sufficient to provide concentrations ranging from 2 to 5% total MgO by weight and from 1 to 10% $Fe_2O_3$ by weight of said refractory.

14. Process for making a high-temperature refractory material, comprising the steps of wet ball-milling a source of CaO selected from the group consisting of CaO, $Ca(OH)_2$, and $CaCO_3$, with a source of MgO selected from the group consisting of MgO, dolomitic hydrate, dolomitic limestone and dolomite, and a source of iron oxide, partially drying the resulting wet ball-milled mixture, extruding said partially dried mixture into bricks, drying said bricks and heating them to a temperature ranging from about 2600 to 2800° F. to fuse a portion of said CaO with said MgO and with said iron oxide to render substantially all of the CaO present inactive to slaking, said sources of MgO and iron oxide being present in quantities sufficient to provide concentrations ranging from 2 to 5% total MgO by weight and from 1 to 10% $Fe_2O_3$ by weight of said refractory.

References Cited in the file of this patent

UNITED STATES PATENTS

| | | |
|---|---|---|
| 1,939,638 | Hyde | Dec. 12, 1933 |
| 2,076,883 | Ernould | Apr. 13, 1937 |
| 2,310,591 | McMullen | Feb. 9, 1943 |